US011089038B2

(12) United States Patent
Muttik (10) Patent No.: US 11,089,038 B2
(45) Date of Patent: Aug. 10, 2021

(54) SAFE SHARING OF SENSITIVE DATA

(71) Applicant: McAfee, LLC, Santa Clara, CA (US)

(72) Inventor: Igor G. Muttik, Berkhamsted (GB)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 16/681,235

(22) Filed: Nov. 12, 2019

(65) Prior Publication Data

US 2020/0120123 A1 Apr. 16, 2020

Related U.S. Application Data

(63) Continuation of application No. 15/282,659, filed on Sep. 30, 2016, now Pat. No. 10,476,900.

(51) Int. Cl.
*H04L 29/06* (2006.01)
*G06F 16/951* (2019.01)
*G06F 21/62* (2013.01)

(52) U.S. Cl.
CPC ........ *H04L 63/1425* (2013.01); *G06F 16/951* (2019.01); *G06F 21/629* (2013.01); *G06F 21/6245* (2013.01); *H04L 63/101* (2013.01); *G06F 2221/033* (2013.01)

(58) Field of Classification Search
CPC .......... G06F 21/31; G06F 21/45; G06F 21/62; G06F 21/629; G06F 17/30864; H04L 63/1425; H04L 63/10; H04L 63/101
See application file for complete search history.

(56) References Cited

U.S. PATENT DOCUMENTS

| 7,657,780 | B2 | 2/2010 | D'Souza et al. |
| 7,949,677 | B2 | 5/2011 | Croft et al. |
| 7,954,150 | B2 | 5/2011 | Croft et al. |
| 8,131,768 | B2 | 3/2012 | Sinha |
| 8,166,406 | B1 * | 4/2012 | Goldfeder ............. H04L 63/102 715/745 |
| 8,170,902 | B2 | 5/2012 | Kennis et al. |
| 8,341,270 | B2 | 12/2012 | Mazzaferri et al. |
| 8,782,744 | B1 | 7/2014 | Fuller et al. |
| 10,250,389 | B2 * | 4/2019 | Blinn ..................... H04L 9/3247 |
| 10,277,622 | B2 * | 4/2019 | DiGiambattista ... G06F 11/3668 |
| 10,476,900 | B2 * | 11/2019 | Muttik .................. H04L 63/101 |
| 2007/0022155 | A1 | 1/2007 | Owens et al. |
| 2013/0152154 | A1 | 6/2013 | Kiao et al. |
| 2015/0096018 | A1 | 4/2015 | Mircescu |
| 2017/0139678 | A1 | 5/2017 | Funakoshi |

FOREIGN PATENT DOCUMENTS

| WO | 2016138067 A1 | 9/2016 |
| WO | 2018064103 A1 | 4/2018 |

OTHER PUBLICATIONS

PCT International Search Report issued in PCT/US2017/053603 dated Dec. 6, 2017, 11 pages.

* cited by examiner

*Primary Examiner* — Hosuk Song (74) *Attorney, Agent, or Firm* — Patent Capital Group (57) ABSTRACT

In an example, there is disclosed a computing apparatus having: a processor; a memory; a data interface; and one or more logic elements providing a verification engine to: receive via the data interface an input script including a request to access enterprise data; analyze the input script to determine that the input script complies with a data request criterion; apply an application programming interface (API) to the input script to collect the enterprise data; and send the enterprise data via the data interface.

20 Claims, 7 Drawing Sheets

SAFE SHARING OF SENSITIVE DATA

CROSS REFERENCE TO RELATED APPLICATION

This application is a continuation (and claims benefit of priority under 35 U.S.C. § 120) of U.S. application Ser. No. 15/282,659, filed Sep. 30, 2016, entitled "SAFE SHARING OF SENSITIVE DATA." The disclosure of this application is considered part of (and is incorporated by reference in) the disclosure of this application.

FIELD OF THE SPECIFICATION

This disclosure relates in general to the field of information security, and more particularly, though not exclusively to, a system and method for safe sharing of sensitive data.

BACKGROUND

Modern companies, and more especially technology companies and security firms, may generate and store large amounts of data. Included within these are certain types of data that are not suitable for sharing outside of the enterprise, such as intellectual property, trade secrets, proprietary, restricted, sensitive, classified, customer, or personal data. Thus, many enterprises are reluctant to share data.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Despite the reluctance for enterprises to share data with one another, there are times when it is necessary. For example, companies may subcontract work to other companies, two or more companies may enter into a joint venture, or companies may band together to jointly prepare and submit a proposal for a contract. Companies may also work with academia or the community, in contexts where they will share certain data, but must maintain the security of others. In the computer security space, to get a full picture of an attack, a security services provider may need to aggregate and correlate threat intelligence from its clients, as well as telemetry with similar feeds from its own competitors.

Sending data out from an enterprise to any non-enterprise actor is an inherently risky act, especially if the volume of data is large. The data may be carefully screened and anonymized before sending, but there is still the danger that some sensitive data were missed. As used throughout this specification, "sensitive data" includes any data or information whose distribution should be limited, including by way of nonlimiting example, intellectual property, trade secrets, company proprietary data, restricted data, sensitive data, classified data, customer lists, personally identifying information (PII), time-sensitive data, and data providing a competitive advantage.

While screened data may not directly include sensitive data, improved data mining techniques (now or in the future) may make it possible to infer sensitive data from nonsensitive data. Screened data may also carry information whose method of extracting will only be discovered later (e.g., anomaly detection via machine learning). Non-disclosure agreements (NDAs) are imperfect protection, because they can be breached, or data can be leaked, intentionally or unintentionally, and once the data are in the wild, they cannot always be recovered.

This could be particularly problematic for a security services provider, as their proprietary data may include threat intelligence and algorithms that enable them to detect and mitigate malicious objects. If attackers gain access to these data, it may enable them to craft new malware that works around these algorithms.

An enterprise may take measures to mitigate the risk of exposure of sensitive data, including for example:

a. Stripping debugging information which may uncover internal product logic, from executables.
b. Removing IP addresses, email addresses, names or other PII from data (i.e., redacting, blacking out, or replacing with hashes).
c. Using aliases (e.g., via table-driven replacements of actual user names with fixed aliases).
d. Aggregating and generalizing data elements (e.g., grouping customers and using the name of a city instead of actual GPS locations).

These methods, done properly, have the potential to effectively mitigate data loss. However, for large data sets, such pre-processing requires either an enormous number of man hours (young litigation associates at large law firms are all familiar with the unforgiving task of manually previewing thousands upon thousands of documents for sensitive or litigation-critical data before production), or a comprehensive parser that is familiar with the entire spectrum of shared data structures. Doing these right even once can be prohibitively expensive, and becomes much more expensive when it must be done on an ongoing basis.

Thus, even when some level of screening is done, it is beneficial to combine the screening with other more responsive techniques, including the use of a verification engine as described in this specification, which can be provided as an outward-facing application programming interface (API). Rather than an enterprise-side data "push," the verification engine API allows the third party to remotely "pull" data by issuing third-party data requests via an input script. The data verification engine can programmatically or mathematically verify the input script to ensure that it will not pull any sensitive data, execute the script, and then verify the requested data package before exporting it to the third party.

As used in this specification, a "script" indicates any command or instruction flow or sequence that is subject to analysis. This can include a classic textual script, such as a sequence of JavaScript commands, a bytecode-compiled script, such as a Java ".jar" file, or even a compiled binary so long as sufficient information is retained to permit analysis, such as a binary with sufficient embedded debugging symbols to permit analysis, or a binary that is defined by a limited structure and subset of instructions that can be reasonably analyzed. The verification engine may be compatible with scripts in some existing language (or a subset thereof), such as JavaScript, Java, C #, C, XML, or similar, or it may provide a purpose-built proprietary language that provides only certain allowed commands. A hybrid of this can be achieved when an existing language is used, but only a subset of its commands are allowed, or a new library is provided that exposes only a certain set of allowed commands.

When the enterprise receives the script, an ingress analyzer may analyze the script initially to verify that it contains only allowed commands, and is structured in such a way as to not retrieve any sensitive data. This analysis may be driven by a rules engine, which looks for certain restricted or allowed operations, structures, and sequences. It may also or alternatively include a symbolic formal or mathematical analysis, using existing tools such as a Coq proof or a Maude system to prove that the input script does not perform any illicit operations. In some cases, the enterprise may provide to the third party an input script validator that the third party can use to verify scripts before attempting to send them to the enterprise.

In an example, the analysis may also be driven by a reputation engine, which may assign the script a reputation based on algorithms similar to assigning reputations to network objects. This could be an internal process, or could be aided by a separate security services provider, such as McAfee®, which maintains a Global Threat Intelligence™ (GTI™) database of reputations.

Once the script has been analyzed and verified, an API engine may execute the script, collecting the requested data. Once the data are gathered, in some embodiments, an egress analyzer may analyze the collected data before it is exported. This may again involve a rules engine, which may include, for example, regular expressions that search for data in the format of names, addresses, GPS coordinates, e-mail addresses, IP addresses, company proprietary or confidential, or other sensitive data. If the data do not pass inspection, they may be rejected, or flagged for additional human analysis.

Providing only a few APIs to access the data store helps to reduce the possibility of abuse. For example, minimally, the script may only have one API to access data, such as ReadTelemetryHash( ), and only one API to emit output, such as WriteLine( ). The ReadTelemetryHash( ) may be implemented to only pass to the script a single hash from a telemetry log. This kind of operation is very safe and automatically removes a risk of exposing any other element of the telemetry log. Additional safe APIs can be added as and when necessary (e.g. ReadTelemetryTimestampforHash( ), which would give the script the timestamp of when a hash has been recorded in telemetry). In certain embodiments, the optimal API exposes exactly the functionality necessary to serve the legitimate purpose of the data transfer, and no additional functionality.

Advantageously, using the verification engine and API of the present specification:
  a. Data never leave the enterprise en masse, thus reducing the risk of re-distribution.
  b. It is easy to control the amount and type of data extracted by the input script (e.g., limit the volume of outgoing information per day or per run, which may be adjusted according to the third party's reputation or country of origin).
  c. It is easy to control the level of access to raw data by modifying the set of APIs provided to the script
  d. A system designer can validate the verification engine by feeding it illegal scripts, or scripts that yield known sensitive information. The validation script can be executed over small artificial data sets, and the ability of the verification engine to detect and block access to sensitive data can be observed and fine-tuned.
  e. It is possible to inspect the outgoing data before it leaves the enterprise (programmatically via, for example, a set of rules and via human inspection).

A system and method for safe sharing of sensitive data will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 1:
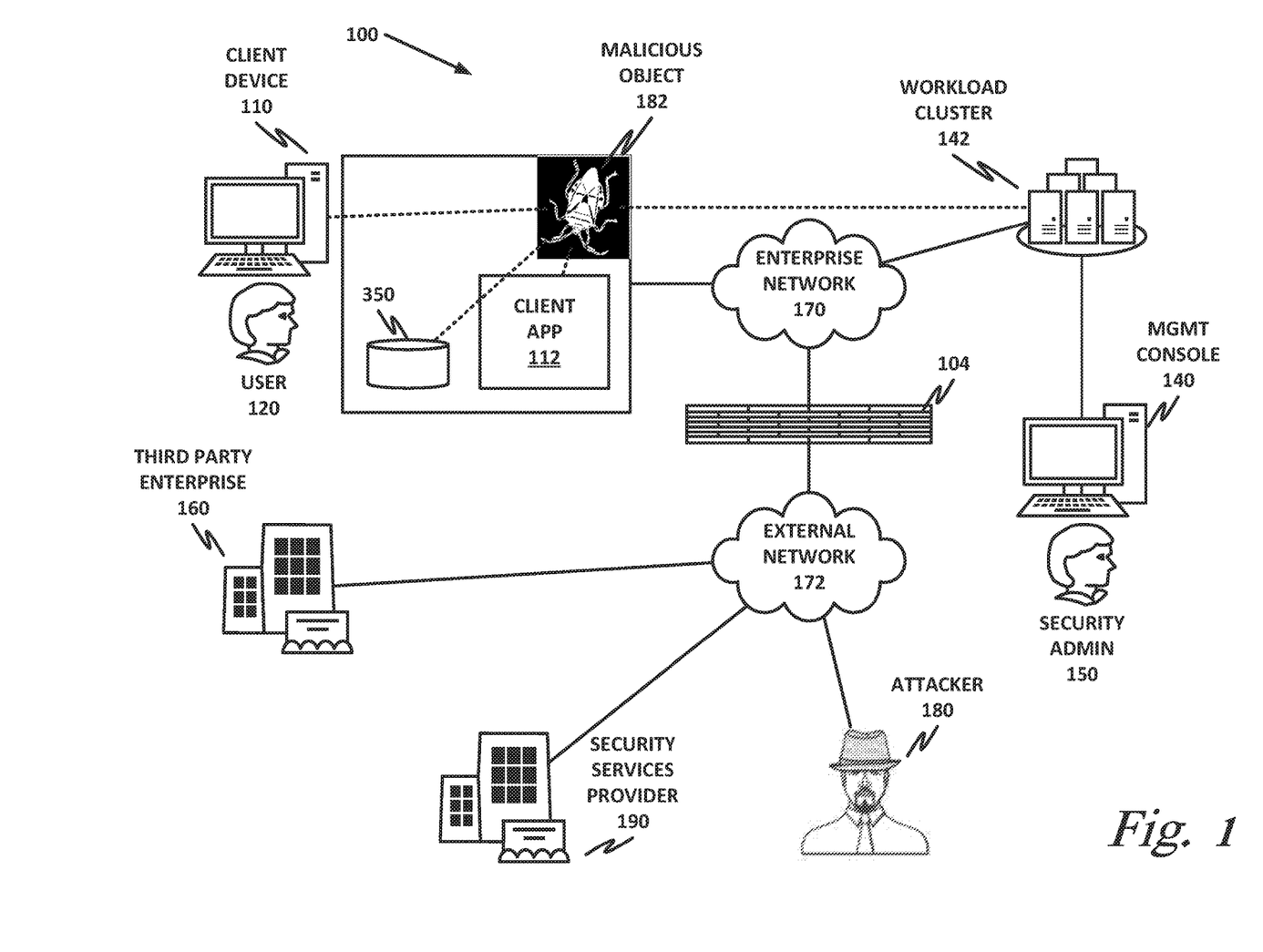
FIG. 1 is a block diagram of a security-enabled network according to one or more examples of the present specification.

FIG. 1 is a network-level diagram of a secured enterprise 100 according to one or more examples of the present specification. In the example of FIG. 1, secured enterprise 100 may need to share data with third party enterprise 160, which may access information or services via external network 172. Enterprise 100 may provide an API and verification engine as disclosed herein, which may allow third-party enterprise to request data.

Within secured enterprise 100, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, attacker 180 (or other similar malicious or negligent actor) may also connect to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing sensitive data as described herein, such as by injecting or executing invalid input scripts or scripts that collect unauthorized data.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign. Note that in addition to providing security reputations, in embodiments where analysis of input scripts relies at least in part on reputations, security services provider 190 may also provide those reputations. In other embodiments, secured enterprise 100 may provide those reputations internally.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Figure 3:
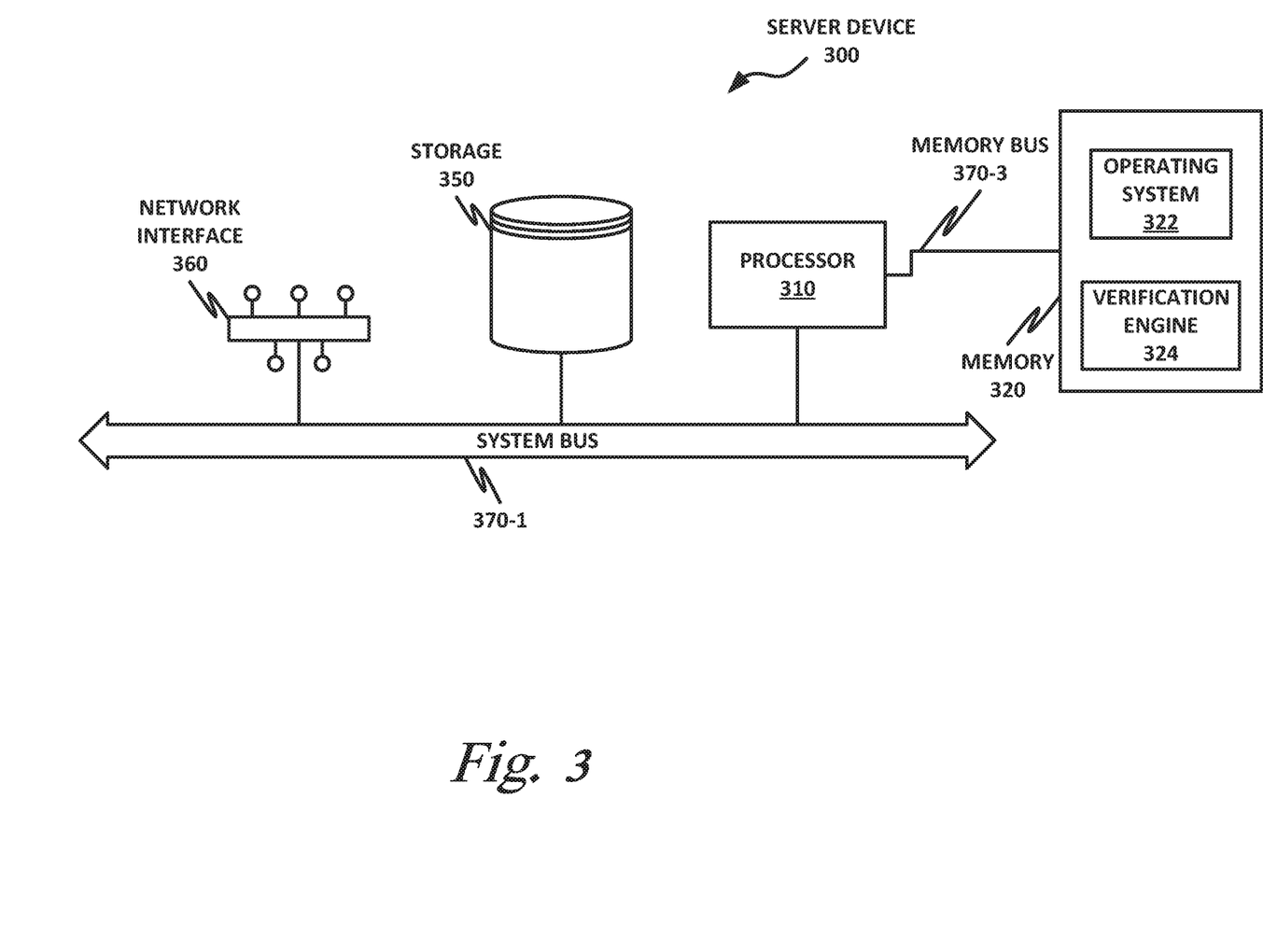
FIG. 3 is a block diagram of a server according to one or more examples of the present specification.

When a new object is first encountered on the network, security policies may initially treat it as "gray" or "suspect." Note that this may include input scripts from third-party enterprise 160, which may be treated as network objects independently of the analysis performed by verification engine 324 of FIG. 3.

As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
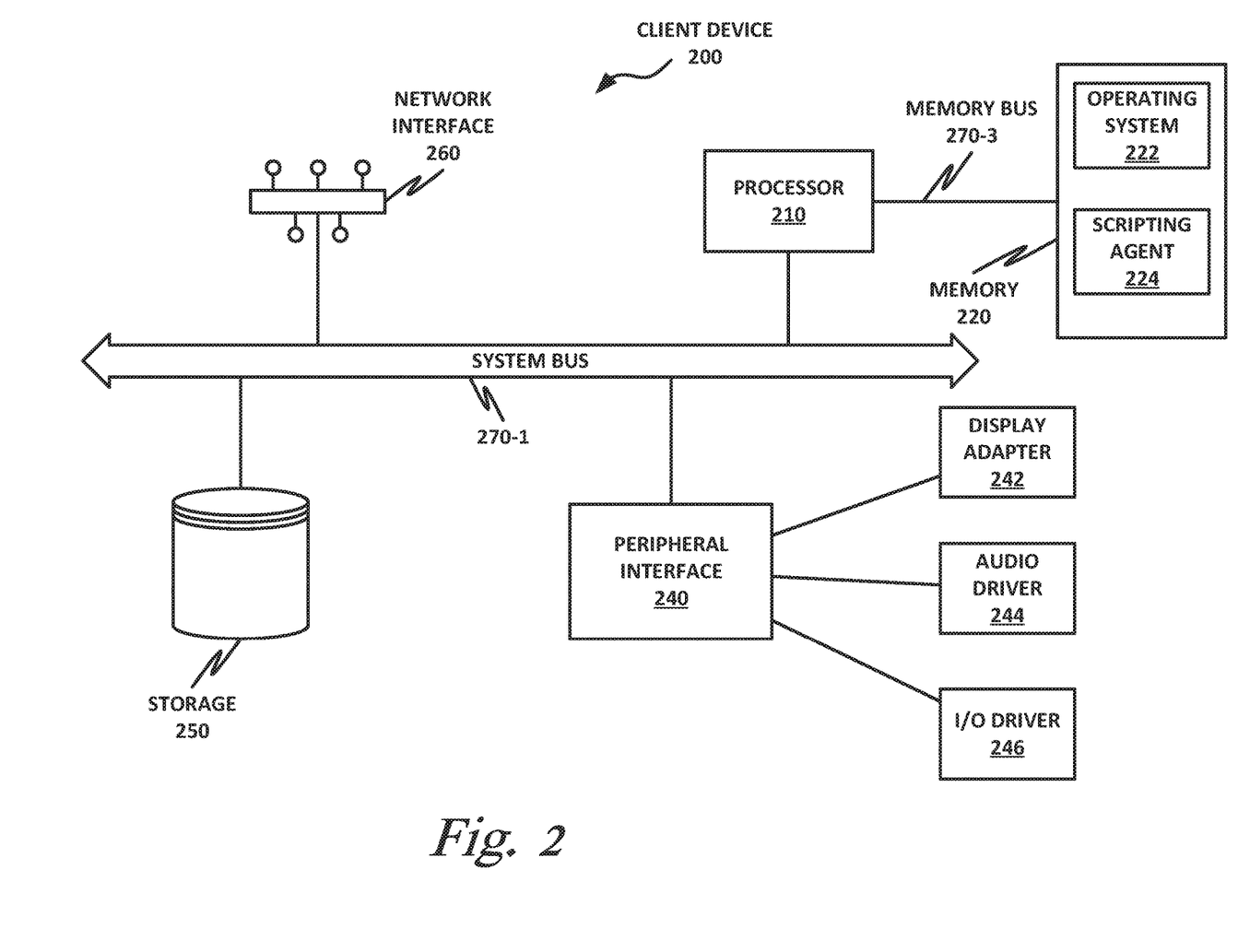
FIG. 2 is a block diagram of a computing device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of client devices 200.

Client device 200 includes a processor 210 connected to a memory 220, having stored therein executable instructions for providing an operating system 222 and at least software portions of a scripting agent 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of scripting agent 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security agent 224, in one example, is operable to carry out computer-implemented methods as described in this specification. Security agent 224 may include one or more tangible non-transitory computer-readable mediums having stored thereon executable instructions operable to instruct a processor to provide a scripting agent 224. As used throughout this specification, an "engine" includes any combination of one or more logic elements, of similar or dissimilar species, operable for and configured to perform one or more methods provided by the engine. Thus, scripting agent 224 may comprise one or more logic elements configured to provide methods as disclosed in this specification. In some cases, scripting agent 224 may include a special integrated circuit designed to carry out a method or a part thereof, and may also include software instructions operable to instruct a processor to perform the method. In some cases, scripting agent 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that scripting agent 224 may also include other hardware and software, including configuration files, registry entries, and interactive or user-mode software by way of non-limiting example.

In one example, scripting agent 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of scripting agent 224 to provide the desired method.

In certain embodiments, scripting agent 224 may include a suitable user interface, such as an integrated development environment (IDE), an editor or graphical user interface (GUI) for building scripts, and a backend that may simulate, compile, interpret, validate, or otherwise process an input script. In some embodiments, scripting agent 224 may include a script validator provided by secured enterprise 100, whose purpose is to simulate running of the script in the network environment, and to verify that the script is valid and will not result in attempted collection of sensitive data. This may help to save time, as third party enterprise 160 may not need to pass input scripts back and forth only to discover that they are invalid or will be rejected. This may also help to increase the reputation of third party enterprise 160, as submission of invalid or suspect scripts may negatively affect its reputation.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a verification engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of verification engine 324.

Network interface 360 may be provided to communicatively couple server 300 to a wired or wireless network, and may include one or more logic elements as described in FIG. 2.

Verification engine 324 is an engine as described in FIG. 2 and, in one example, includes one or more logic elements operable to carry out computer-implemented methods as described in this specification. Software portions of verification engine 324 may run as a daemon process.

Verification engine 324 may include one or more non-transitory computer-readable mediums having stored thereon executable instructions operable to instruct a processor to provide verification engine 324. At an appropriate time, such as upon booting server 300 or upon a command from operating system 322 or a user 120 or security administrator 150, processor 310 may retrieve a copy of verification engine 324 (or software portions thereof) from storage 350 and load it into memory 320. Processor 310 may then iteratively execute the instructions of verification engine 324 to provide the desired method. Additional aspects of verification engine 324 are discussed in connection with FIG. 4 below.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
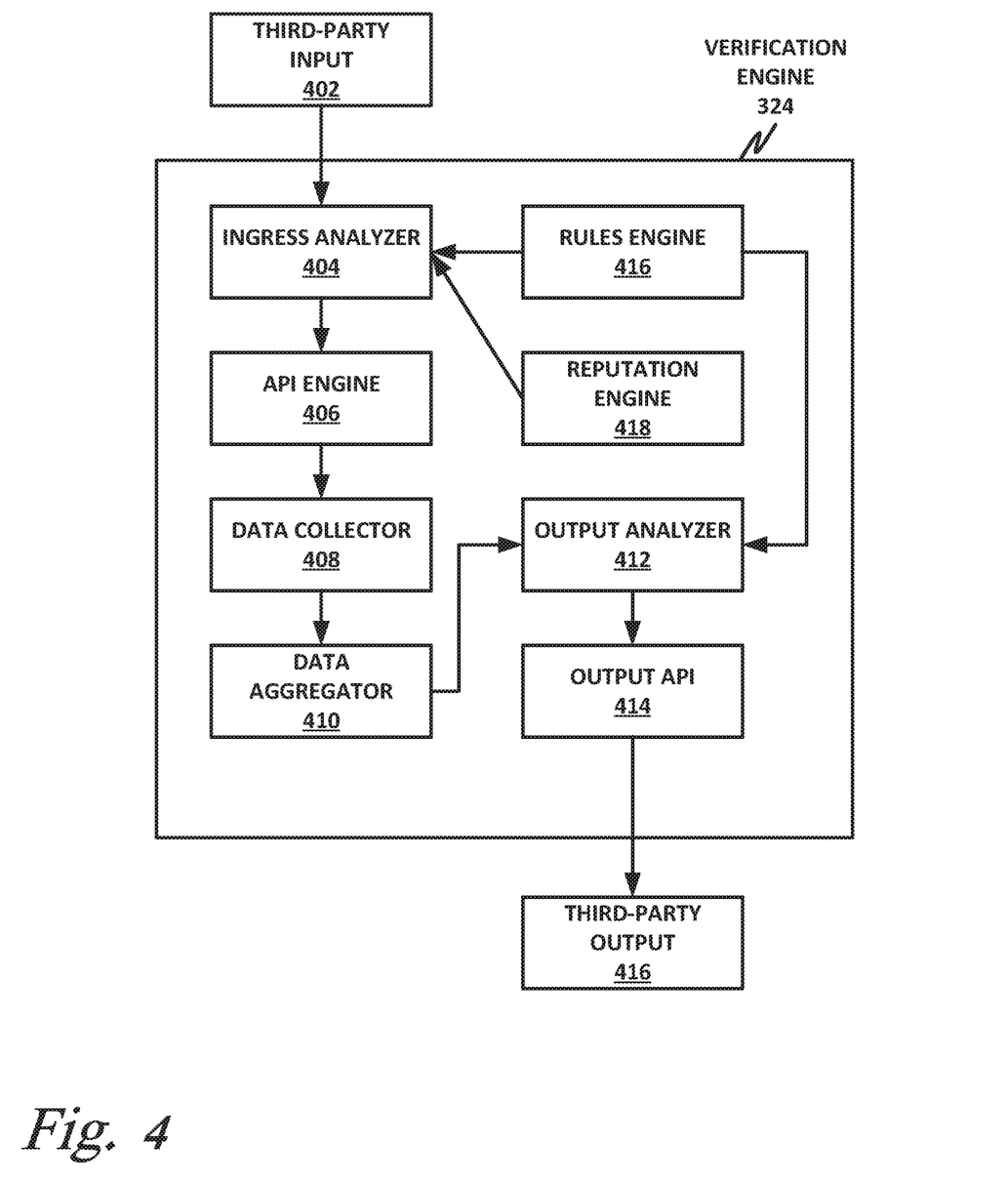
FIG. 4 is a block diagram of a verification engine according to one or more examples of the present specification.

FIG. 4 is a block diagram of a verification engine 324 according to one or more examples of the present specification. In the example of FIG. 4, a third party (such as third-party enterprise 160) provides a third-party input 402. This may be an input script as discussed throughout this specification.

After receiving the input script, verification engine 324 subjects third-party input 402 to an ingress analyzer 404. Ingress analyzer 404 may be configured to perform an initial analysis to ensure that input script 402 performs only authorized operations, and that it will not result in the export is restricted or sensitive data. This analysis may be driven by rules engine 416, which looks for certain restricted or allowed operations, structures, and sequences. Rules engine 416 may include a set of rules that list, for example, authorized or restricted operations, authorized or restricted types of data for export or types of operations that may be performed on various types of data, rules concerning which third parties are permitted to perform which operations on which data sets, or any other rules that may be used to validate the input script. The application of static or dynamic rules may be used in addition to or in conjunction with the formal verification methods discussed herein.

It may also or alternatively include a symbolic formal or mathematical analysis, using existing tools such as a Coq proof or a Maude system to prove that the input script does not perform any illicit operations.

In an example, the analysis may also receive input from reputation engine 418, which may assign the script a reputation based on algorithms similar to assigning reputations to network objects. This could be an internal process, or could be aided by a separate security services provider, such as McAfee®, which maintains a Global Threat Intelligence™ (GTI™) database of reputations.

Reputation engine 418 may either independently assign a reputation the input script, or may interface with a third party, such as McAfee® or another security service provider 190. The reputation in this context may be similar to reputations provided for network objects by McAfee's global threat intelligence (GTI™) database, though the example is nonlimiting. Other types of reputations may be used, and in general a reputation may represent the likelihood that a scripts is legitimate, which may be based on a combination of factors, such as the source enterprise (e.g., does the script come from a source known to send good scripts), a signature (does the script have a signature that matches a previously-verified script), or other factors.

To facilitate discussion, a more suspect reputation may be considered a "low" reputation, while a less suspect reputation may be considered a "high" reputation. But this is not intended to imply that the reputation need be a simple scalar score with low values representing "bad" and high values representing "good." Rather, the designations "high" and "low" are intended to conceptually represent the trust level of a particular object. In a broader sense, the reputation may be a multi-dimensional score that could include factors such as the reputation of the third-party, a digital signature of the script, the size of the script, the number of scripts received from a single source in a time unit, the complexity of the script, the range of commands used in the script, and whether the script is a signed or verified binary.

In some embodiments, the higher the reputation, the less scrutiny may be required for the script. For example, if the script receives a low reputation score, then no data may be exported until the script and its output have both been subjected to expert manual analysis by a human security specialist. On the other hand, a script with a very high reputation (e.g., one from a trusted source that has a signature matching a previously verified script) may be subject to little or no analysis before it is allowed to run.

Once the script is validated and authorized, it may be provided to API engine 406. API engine 406 provides the implements the API and executes internal commands responsive to commands provided by input script 402. API engine 406 may provide signals to a data collector 408, which acts collects the actual data from a data store. In some embodiments, data collector 408 is a nontrivial software component, which may provide a complicated and logic-intensive process of matching regular expressions, looking for certain metadata, searching search terms, or crunching, analyzing, compressing, decompressing, or otherwise processing data.

Data aggregator 410 aggregates the data provided by data collector 408. This may include categorizing, compressing, packaging, sorting, organizing, or otherwise processing data to make it suitable for export to and consumption by a third party. Note that data aggregator 410 may also have the task of masking, obfuscating, or rejecting certain portions of the data collected by data collector 408. For example, if the data include emails, data aggregator 410 may redact specific email addresses and other personally identifying information. Other types of data that may be obfuscated or redacted include names, addresses, phone number, social security numbers, account numbers, credit card data, billing data, personal preferences, locations, or any other sensitive data. This enables secured enterprise 100 to export certain documents that contain sensitive data without compromising those sensitive data.

Data aggregator 410 provides its aggregated and screened data to an output analyzer 412. Output analyzer 412 may perform a final check on the data proposed for export to ensure that none of the data include sensitive information or otherwise disclose information that should not be given to the third party. If output analyzer 412 determines that the aggregated data include sensitive information or otherwise are not suitable for export, it may raise an error condition. Responsive to the error condition, output analyzer 412 may, for example, pass the data back to data aggregator 410 to redact sensitive data. Alternately, data aggregator 412 may fail the operation, excise sensitive documents, update a reputation for the script or its source third party, and/or notify a security expert that the input script may be either negligent or malicious so that further remedial action may be taken.

Output analyzer 412 may also interface with rules engine 416. Rules engine 416 may use the same or different rules for output analyzer 412 that it applies to ingress analyzer 404, or there may be partial or no overlap.

Output analyzer 412 provides its screened and verified data to output API 414. Output API 414 provides external interfaces to third-party enterprise 160, which enables third-party enterprise 160 to receive the requested data. These are received as third-party output 416, which are exported to third-party enterprise 160 for its legitimate and authorized used.

Figure 5:
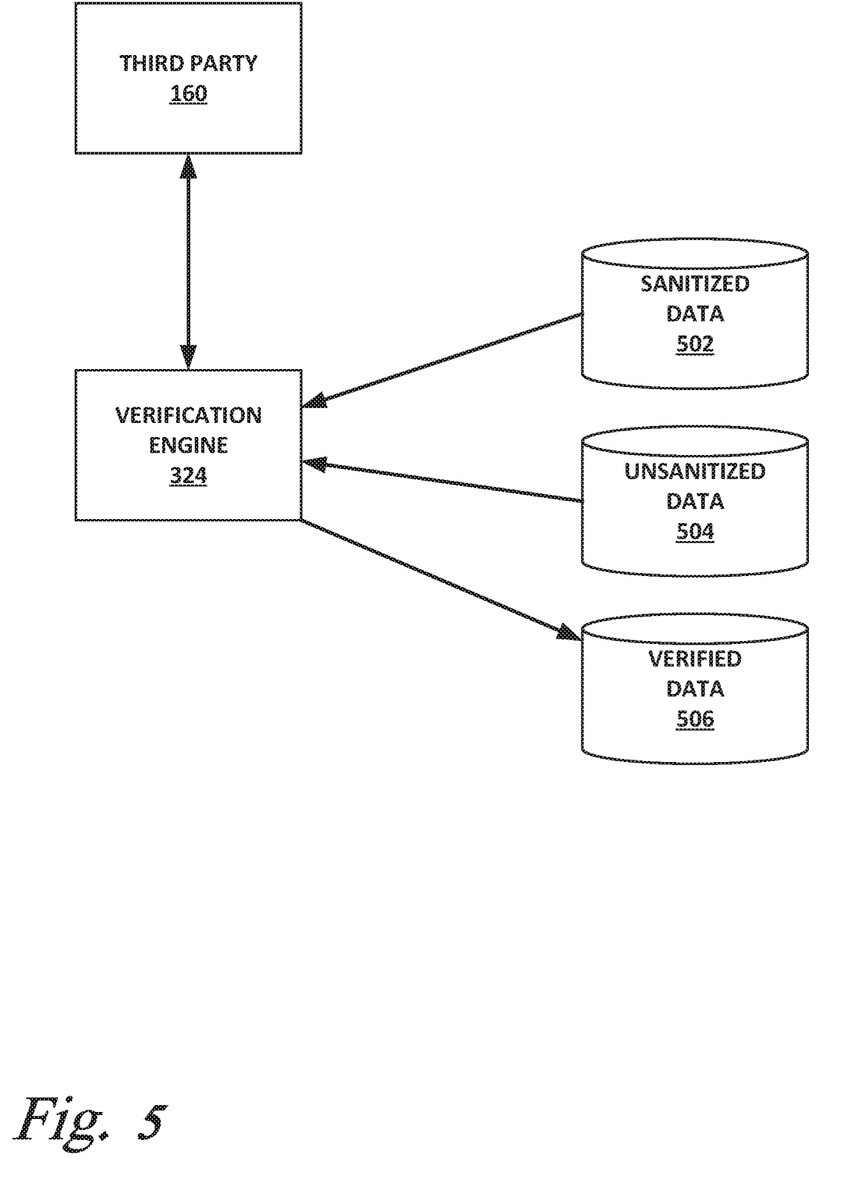
FIG. 5 is a block diagram of a sharing data architecture according to one or more examples of the present specification.

FIG. 5 is a block diagram of a data architecture according to one or more examples of the present specification. The data architecture disclosed herein may help to drive the analysis of input scripts and the analysis of proposed output, and thus may be encoded in whole or in part in one or more of ingress analyzer 404, rules engine 416, reputation engine 418, or third-party output 416.

In this example, two classes of data are identified. First, there is a class of sanitized data 502. Sanitized data 502 includes data that lack sensitive information, to a sufficient degree of confidence, that they may be exported to at least some third parties with little or no additional screening. Sanitized data 502 may include documents that have sensitive data that have been pre-screened, redacted, obfuscated, or otherwise sanitized in a pre-processing phase. Depending on the identity of third-party enterprise 160, verification engine 324 may be authorized to export some or all of sanitized data 500 to third-party enterprise 160 with little or no restriction.

On the other hand, unsanitized data 504 include data that have either been definitively identified as containing sensitive information, or data whose sensitivity state is unknown. This may include unanalyzed documents and unscreened documents, as well as documents already identified as containing sensitive data. Thus, exporting unsanitized data 504 wholesale to third-party 160 can be very dangerous. It is therefore desirable to analyze unsanitized data 504 before any exports. This may include the methods disclosed herein. Specifically, it may not be necessary to wholesale analyze, preprocess, and categorize all unsanitized data 504 into sanitized data 502. Rather, when third-party enterprise 160 issues a data request to verification engine 324, the verification engine may use the methods disclosed herein, including the logical processing blocks of FIG. 4, to analyze the requested portions of unsanitized data 504 and determine whether those may be exported, and before they are exported, whether they need to be sanitized. In some embodiments, data are retrieved from unsanitized data 504, aggregated by data aggregator 410, and then sanitized according to methods disclosed herein. As appropriate, some or all of those data may then be stored as sanitized data 502.

Once verification engine 324 has aggregated and optionally sanitized data from both sanitized data 502 and unsanitized data 504, these data may be aggregated into a verified data block 506. Verified data 506 is ready for export to third-party enterprise 160 without any additional restrictions.

Note that data that are considered sanitized versus unsanitized need not be static categories. In particular, these categories may change depending on the identity of third-party enterprise 160. For example, if third-party enterprise 160 is a partner in preparing a joint proposal, then data about the proposal may be shared relatively freely with third-party enterprise 160. On the other hand, if third-party enterprise 160 is part of a competing proposal team, then data about the proposal may be highly restricted for that third-party. Thus, the categories of sanitized versus unsanitized data may be dynamic and contextual depending on the circumstances. Data is not considered verified data 506 until it is certified for export to the particular third-party enterprise 160.

Figure 6:
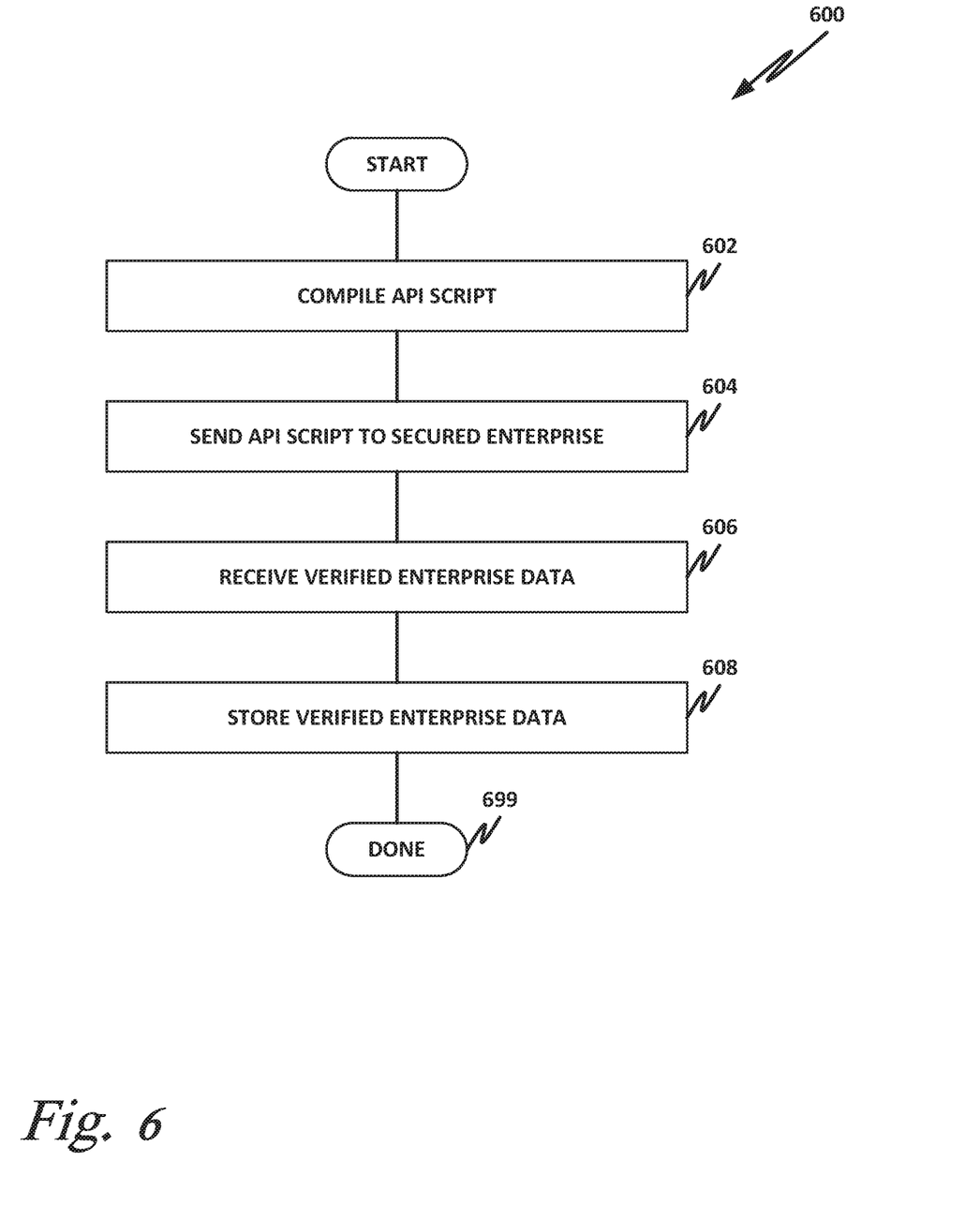
FIG. 6 is a flow chart of a method of a third party requesting access to data according to one or more examples of the present specification.

FIG. 6 is a flowchart of a method 600 of a third party requesting data from secured enterprise 100 according to one or more examples of the present specification.

In block 602, third-party 160 compiles an API script. Compiling the API script may be a task that may be wholly automated by scripting engine 224, or that is performed by an internal programmer who has been provided with a copy of the API specification and associated documentation. Once a candidate API script is compiled, the API script may be subjected to analysis by a third-party API script analyzer. This may have been provided by secured enterprise 100 to verify the candidate scripts before they are uploaded to secured enterprise 100. This allows third-party enterprise 160 to prescreen its own scripts before sending them out. This helps to ensure that third-party enterprise 160 maintains a high reputation of sending good scripts, which may help to ensure that it has faster turnaround times in the future, and also may help to avoid wasted time with sending scripts back and forth and finding out that they are invalid.

In block 604, once the script is ready, third-party enterprise 160 sends the API script to secured enterprise 100.

In block 606, third-party enterprise 160 waits until it receives the verified enterprise data from secured enterprise 100. Third-party enterprise 160 may then perform any necessary work, analysis, or tasks associated with the received verified enterprise data.

In block 699, the method is done.

Figure 7:
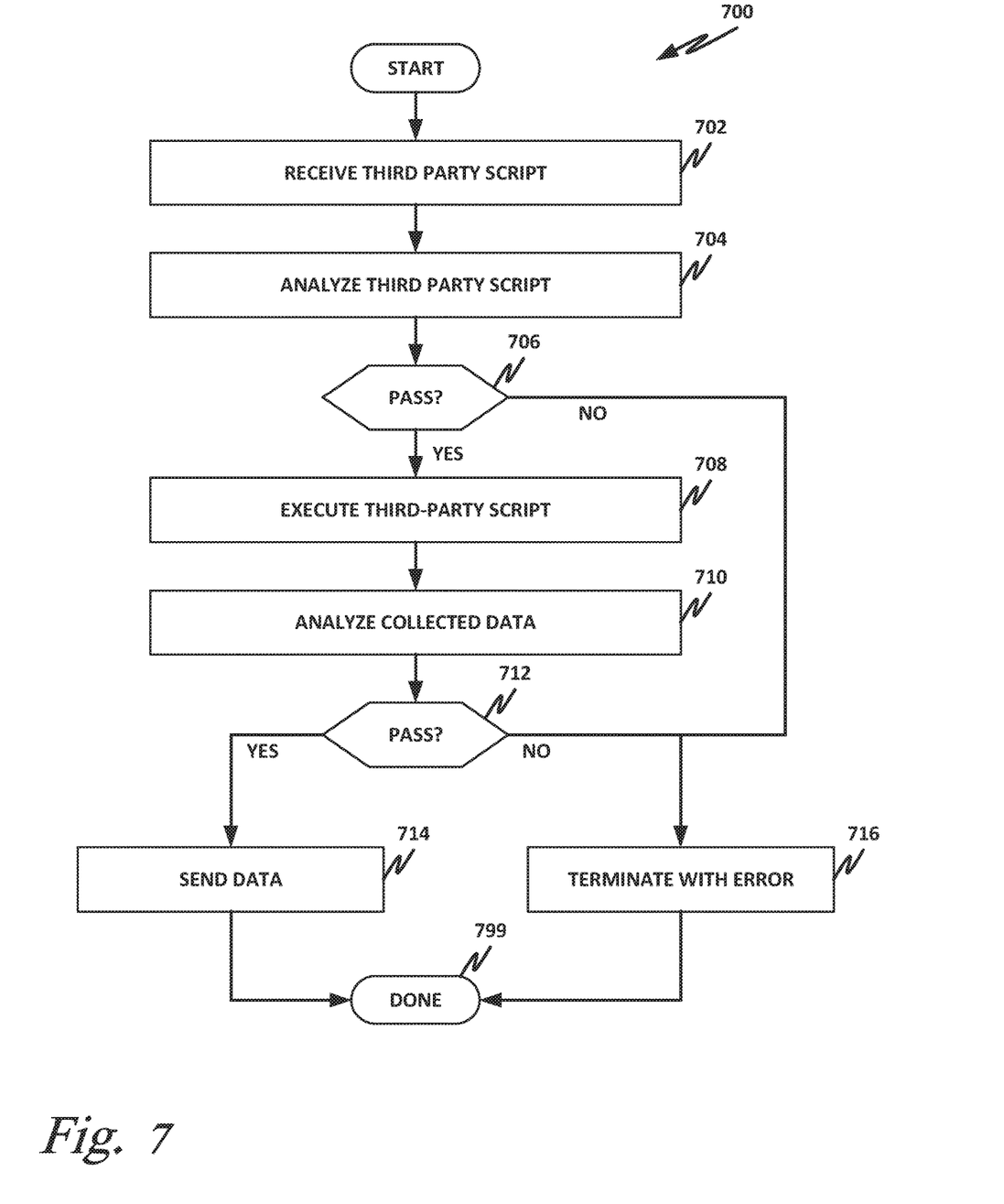
FIG. 7 is a flow chart of a method of verifying a data request and providing data according to one or more examples of the present specification.

FIG. 7 is a flowchart of a method 700 performed by verification engine 324 according to one or more examples of the present specification.

In block 702, verification engine 324 receives the input script from third-party enterprise 160.

In block 704, verification engine 324 analyzes the third-party input scripts according to the methods disclosed herein. Specifically, verification engine 324 may deploy ingress analyzer 404 of FIG. 4, as described in greater detail above.

In decision block 706, verification engine 324 determines whether the input script has passed the verification process.

If the script has not passed, then in block 716, the attempted script terminates with an error. The error may cause the script to simply fail, with or without notice, or it may trigger other actions, such as a change in reputation, a notification to a security administrator, a notice to third-party enterprise 160, or any other suitable action. Once the process is terminated with error, in block 799, the method is done.

Returning to decision block 706, if the script passes, then in block 708, API engine 406 executes the third-party script. In this case, verification engine 324 may deploy API engine 406 of FIG. 4, as described in greater detail above.

In block 710, data collector 408 collects the requested data, and data aggregator 410 aggregates and processes the data as described above. Output analyzer 412 then analyzes the collected data.

In decision block 712, if the analysis fails, then in block 716, the process terminates with an error, and in block 799 the method is done.

Returning to decision block 712, if the proposed export data passes analysis, then in block 714, verification engine 324 sends the data to third-party enterprise 160 via output API 414.

In block 799, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example an enterprise data server to provide regulated access of enterprise data to non-enterprise third parties, comprising: a hardware platform comprising a processor and a memory; a network interface; an enterprise data store, or an interface to access the enterprise data store; a reputation engine to receive a third-party script via the network interface and to assign a reputation to the third-party script; an ingress analyzer to scrutinize the third-party script according to the reputation and determine whether the third-party script may run; and a data collector to collect enterprise data from the enterprise data repository if the third-party script may run.

There is further disclosed an example enterprise data server, wherein the reputation is based at least in part on a source of the third-party script.

There is further disclosed an example enterprise data server, wherein the reputation is based at least in part on a signature provided with the third-party script.

There is further disclosed an example enterprise data server, wherein the reputation is a scalar representation.

There is further disclosed an example enterprise data server, wherein the scalar representation is a three-tier representation.

There is further disclosed an example enterprise data server, wherein the reputation is a multi-dimensional reputation.

There is further disclosed an example enterprise data server, wherein the ingress analyzer is to permit the third-party script if it has a trusted reputation.

There is further disclosed an example enterprise data server, wherein assigning the reputation to the third-party script comprises querying a global reputation store.

There is further disclosed an example enterprise data server, further comprising a rules engine to verify the third-party script against a set of permissible behavior rules.

There is further disclosed an example enterprise data server, wherein the ingress analyzer is to verify that the third-party script accesses only authorized data sources.

There is further disclosed an example enterprise data server, wherein the ingress analyzer is to verify that the third-party script includes only authorized data operations.

There is further disclosed an example enterprise data server, wherein the ingress analyzer is to mathematically prove that the third-party script includes not illicit operations.

There is also disclosed an example of one or more tangible, non-transitory computer-readable storage media having stored thereon executable instructions to: receive an incoming third-party data request; assign a reputation to the third-party request; scrutinize the third-party request according to the reputation and determine whether to service the third-party request; and collect enterprise data from an enterprise data repository if the third-party request is to be serviced.

There is further disclosed an example of one or more tangible, non-transitory computer-readable media, wherein the incoming third-party data request is a script.

There is further disclosed an example of one or more tangible, non-transitory computer-readable media, wherein the reputation is based at least in part on a source of the third-party request.

There is further disclosed an example of one or more tangible, non-transitory computer-readable media, wherein the reputation is based at least in part on a signature provided with the third-party request.

There is further disclosed an example of one or more tangible, non-transitory computer-readable media, wherein the reputation is a scalar representation.

There is further disclosed an example of one or more tangible, non-transitory computer-readable media, wherein the scalar representation is a three-tier representation.

There is further disclosed an example of one or more tangible, non-transitory computer-readable media, wherein the reputation is a multi-dimensional reputation.

There is further disclosed an example of one or more tangible, non-transitory computer-readable media, wherein the instructions are to permit the third-party request if it has a trusted reputation.

There is further disclosed an example of one or more tangible, non-transitory computer-readable media, wherein assigning the reputation to the third-party request comprises querying a global reputation store.

There is further disclosed an example of one or more tangible, non-transitory computer-readable media, wherein the instructions are further to verify the third-party request against a set of permissible behavior rules.

There is further disclosed an example of one or more tangible, non-transitory computer-readable media, wherein the instructions are to verify that the third-party request is directed only authorized data sources.

There is further disclosed an example of one or more tangible, non-transitory computer-readable media, wherein the ingress analyzer is to verify that the third-party request results in only authorized data operations.

There is also disclosed an example computer-implemented method of servicing third-party enterprise data requests, comprising: receiving a third-party script; assigning a reputation to the third-party script; analyzing the third-party script in view of the reputation to decide whether the third-party script is permissible; and if the third-party script is permissible, executing the third-party script via a scripting API to collect enterprise data requested in the third-party script.

There is further disclosed an example method, wherein the reputation is based at least in part on a source of the third-party script.

There is further disclosed an example method, wherein the reputation is based at least in part on a signature provided with the third-party script.

There is further disclosed an example method, wherein the reputation is a scalar representation.

There is further disclosed an example method, wherein the scalar representation is a three-tier representation.

There is further disclosed an example method, wherein the reputation is a multi-dimensional reputation.

There is further disclosed an example method, wherein the ingress analyzer is to permit the third-party script if it has a trusted reputation.

There is further disclosed an example method, wherein assigning the reputation to the third-party script comprises querying a global reputation store.

There is further disclosed an example method, further comprising verifying the third-party script against a set of permissible behavior rules.

There is further disclosed an example method, further comprising verifying that the third-party script accesses only authorized data sources.

There is further disclosed an example method, further comprising verifying that the third-party script includes only authorized data operations.

There is further disclosed an example method, further comprising mathematically proving that the third-party script includes not illicit operations.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of any of a number of the above examples.

There is further disclosed an example apparatus, wherein the apparatus is a computing system.

There is further disclosed an example of at least one computer readable medium comprising instructions that, when executed, implement a method or realize an apparatus as illustrated in a number of the above examples.

What is claimed is:

1. An enterprise data server to provide regulated access of enterprise data to non-enterprise third parties, comprising:
   a hardware platform comprising a processor and a memory;
   a network interface;
   an enterprise data store, or an interface to access the enterprise data store;
   a reputation engine to receive a third-party script via the network interface and to assign a reputation to the third-party script, the third-party script including instructions to export data from the enterprise data store to a third-party contracted to receive data from the enterprise data store;
   an ingress analyzer to scrutinize the third-party script according to the reputation and determine whether the third-party script may run; and a data collector to collect enterprise data from the enterprise data store if the third-party script may run.

2. The enterprise data server of claim 1, wherein the reputation is based at least in part on a source of the third-party script.

3. The enterprise data server of claim 1, wherein the reputation is based at least in part on a signature provided with the third-party script.

4. The enterprise data server of claim 1, wherein the reputation is a scalar representation.

5. The enterprise data server of claim 4, wherein the scalar representation is a three-tier representation.

6. The enterprise data server of claim 1, wherein the reputation is a multi-dimensional reputation.

7. The enterprise data server of claim 1, wherein the ingress analyzer is to permit the third-party script if it has a trusted reputation.

8. The enterprise data server of claim 1, wherein assigning the reputation to the third-party script comprises querying a global reputation store.

9. The enterprise data server of claim 1, further comprising a rules engine to verify the third-party script against a set of permissible behavior rules.

10. The enterprise data server of claim 1, wherein the ingress analyzer is to verify that the third-party script accesses only authorized data sources.

11. The enterprise data server of claim 1, wherein the ingress analyzer is to verify that the third-party script includes only authorized data operations.

12. The enterprise data server of claim 1, wherein the ingress analyzer is to mathematically prove that the third-party script includes not illicit operations.

13. One or more tangible, non-transitory computer-readable storage mediums having stored thereon executable instructions to:
  receive an incoming third-party data request, the third-party data request including instructions to export data from an enterprise data store to a third-party contracted to receive data from the enterprise data store;
  assign a reputation to the third-party data request;
  scrutinize the third-party data request according to the reputation and determine whether to service the third-party data request; and
  collect enterprise data from an enterprise data repository if the third-party data request is to be serviced.

14. The one or more tangible, non-transitory computer-readable mediums of claim 13, wherein the incoming third-party data request is a script.

15. The one or more tangible, non-transitory computer-readable storage mediums of claim 13, wherein the reputation is based at least in part on a source of the third-party data request.

16. The one or more tangible, non-transitory computer-readable storage mediums of claim 13, wherein the reputation is based at least in part on a signature provided with the third-party data request.

17. The one or more tangible, non-transitory computer-readable storage mediums of claim 13, wherein assigning the reputation to the third-party data request comprises querying a global reputation store.

18. The one or more tangible, non-transitory computer-readable storage mediums of claim 13, wherein the executable instructions are to verify that the third-party data request is directed only authorized data sources.

19. A computer-implemented method of servicing third-party enterprise data requests, comprising:
  receiving a third-party script, the third-party script including instructions to export data from an enterprise data store to a third-party contracted to receive data from the enterprise data store;
  assigning a reputation to the third-party script;
  analyzing the third-party script in view of the reputation to decide whether the third-party script is permissible; and
  if the third-party script is permissible, executing the third-party script via a scripting API to collect enterprise data requested in the third-party script.

20. The method of claim 19, further comprising verifying that the third-party script includes only authorized data operations.

* * * * *